Patented Sept. 8, 1925.

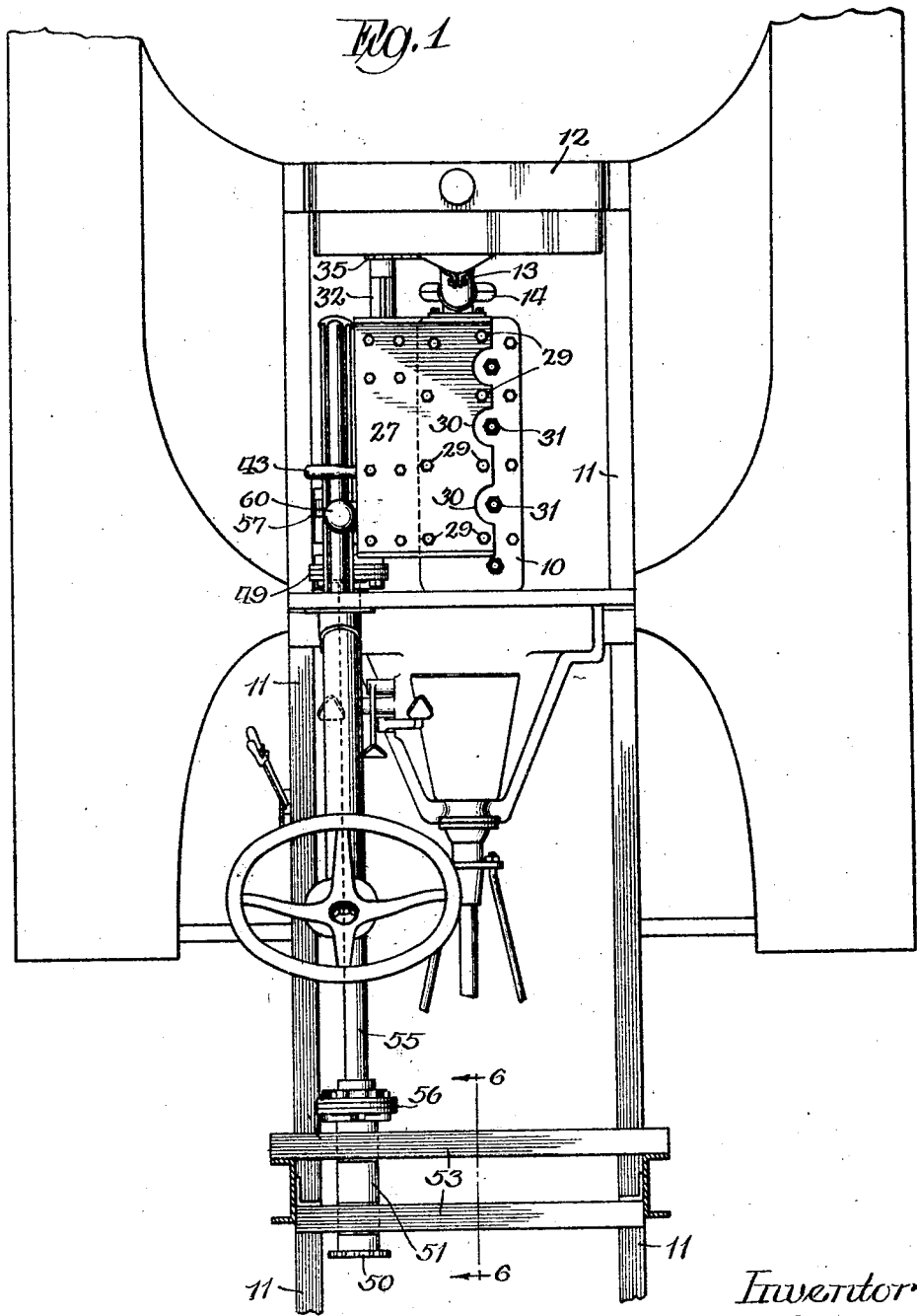

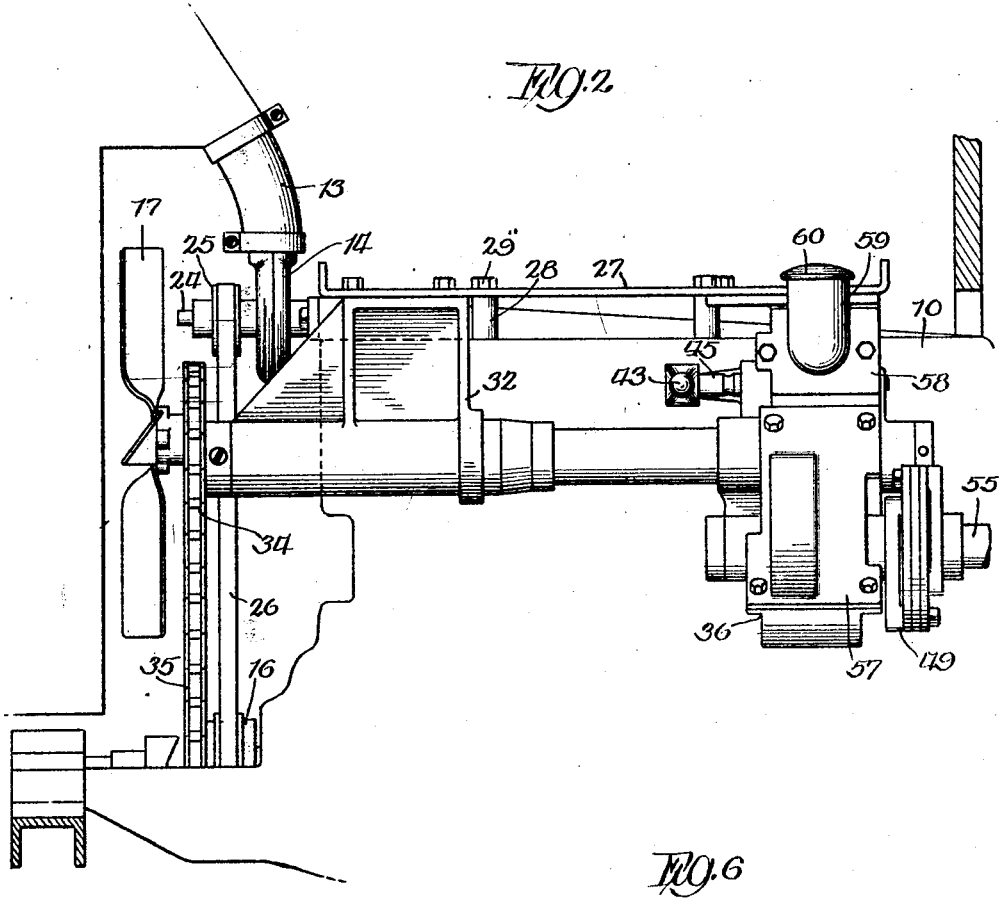
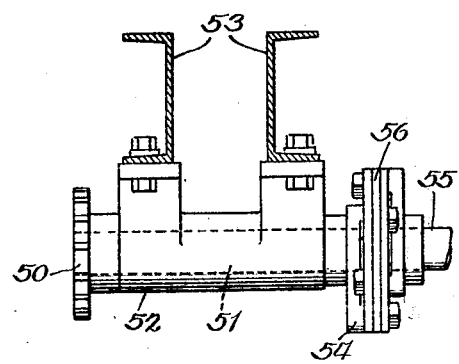

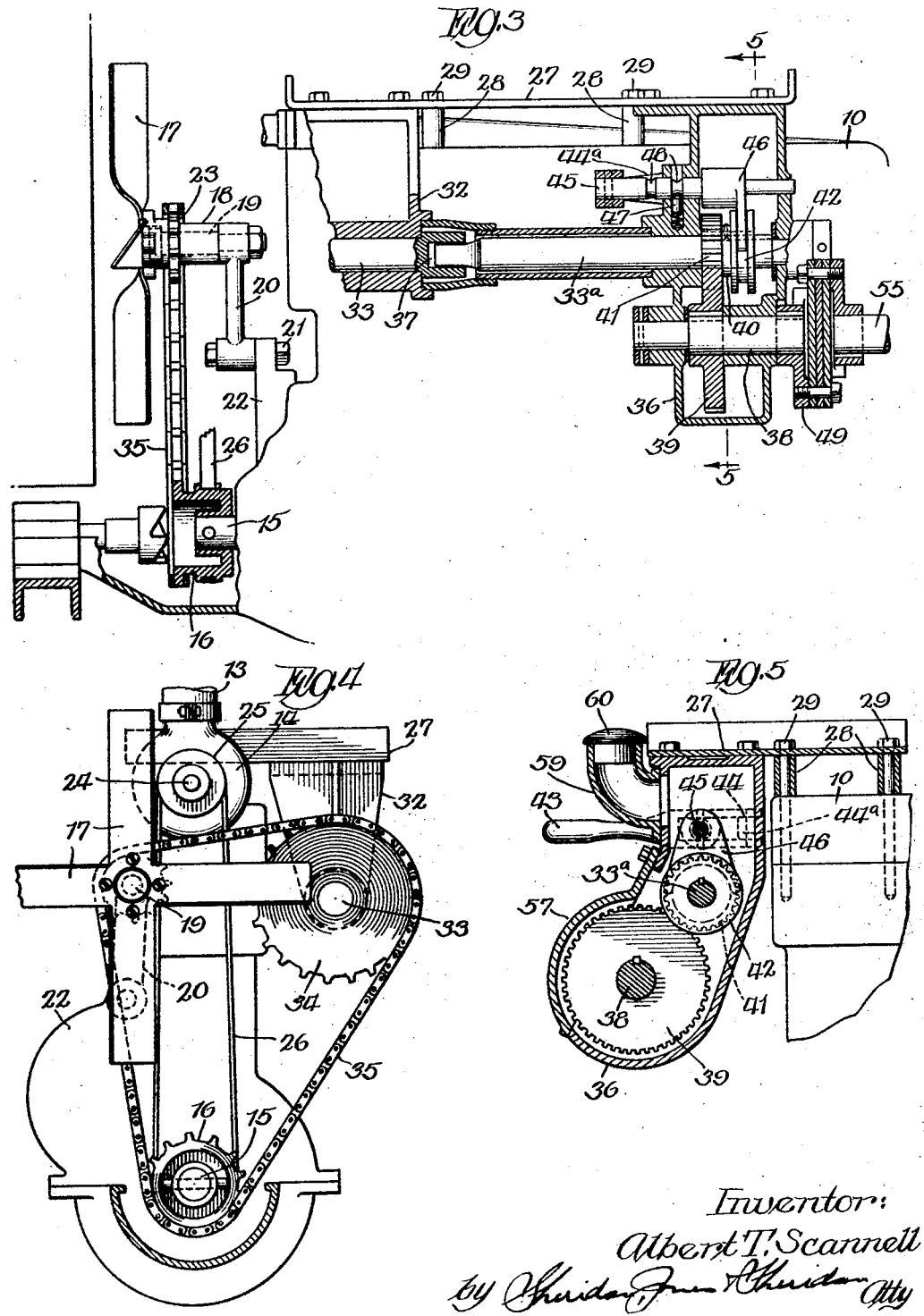

1,552,572

UNITED STATES PATENT OFFICE.

ALBERT T. SCANNELL, OF CHICAGO, ILLINOIS.

POWER-TRANSMITTING MECHANISM.

Application filed March 1, 1923. Serial No. 622,001.

*To all whom it may concern:*

Be it known that I, ALBERT T. SCANNELL, a citizen of the United States, residing at Chicago, in the county of Cook and State of Illinois, have invented certain new and useful Improvements in Power-Transmitting Mechanism, of which the following is a specification.

This invention relates to improvements in power-transmitting mechanism, and more particularly to mechanism of this character such as is now commonly known as a power take-off for motor vehicles.

As is well known, it has been found very advantageous in the operation of many different types of portable apparatus, farm machinery, concrete mixing machines, pumps, etc., to drive the same from the power plant of a motor vehicle either through some driven element of the vehicle itself—such as one of the rear wheels thereof, the rear axle, etc.,—or through specially designed take-off attachments. As above pointed out, the present invention contemplates improvements in the latter, that is, the power take-off attachments.

Heretofore a number of these attachments have been designed, but in practice have proved objectionable for many reasons, primarily because they are cumbersome, inefficient, and expensive, and require considerable change and dismantling in a vehicle when they are installed. Furthermore, they detract from the usefulness of the vehicle as such.

One object of the present invention is to provide an efficient power take-off for motor vehicles which may be installed quickly and economically with a minimum amount of change and dismantling in the vehicle.

Another object is to provide an attachment of the class described which, after the same has been installed, may be left in place indefinitely without detracting from the usefulness of the vehicle as such, and at the same time provides power-transmitting means always available whenever desired.

A further object is to provide power take-off mechanism which will not interfere with the operation of the vehicle, both the latter and the take-off being capable of operation at the same time, should occasion require.

Many other objects and advantages will become apparent from the following description, taken in connection with the accompanying drawings, wherein one form and adaptation of the invention are illustrated.

Figure 1 is a top plan view of a motor vehicle showing the present attachment operatively associated therewith;

Fig. 2 is a side elevation of the power plant of the vehicle showing the present improvements in operative position;

Fig. 3 is a view similar to Fig. 2 showing parts of the present improvements in section;

Fig. 4 is a front elevation of the power plant of the vehicle, showing the power take-off attachment in operative position;

Fig. 5 is a sectional view, taken on the line 5—5 of Fig. 3; and

Fig. 6 is a sectional view, taken on the line 6—6 of Fig. 1.

By reference to the drawings, it will be apparent to those skilled in the art that a motor vehicle of the Ford type has been selected for illustrating the present invention. It will be readily appreciated, however, from the following detailed description, that the present improvement is not limited in its usefulness to merely this type of vehicle, the same being of much broader scope and capable of use in connection with any motor vehicle now in use. Only slight changes in the arrangement of the parts are necessitated in adapting the invention to motor vehicle power plants of different types.

Referring more in detail to the drawings, the power plant of the vehicle is shown at 10 mounted in the usual way upon the frame 11. The engine of the power plant is of the water-cooled type, the cooling radiator being shown at 12 mounted in advance of the engine and also supported on the frame of the vehicle. 13 designates the coupling or connection between the water jacket of the engine and the upper portion of the radiator, a pump 14, which may be of any of the well known types, being shown interposed in this connection 13. The crank shaft of the engine is shown at 15 projecting forwardly of the housing casting and is provided on its exposed end with a combination sprocket wheel and pulley 16. A cooling fan 17 is suitably attached to a hub member 18, which is rotatably mounted upon a stud 19 carried by the upper end of the oscillatory arm 20, the latter being pivoted, as at 21, to an upstanding arm 22, suitably supported from the engine casting.

Carried by the hub member 18, slightly in arrears of the fan 17, is a second sprocket wheel 23, directly above and in alinement with a sprocket wheel of the member 16. The shaft 24 of the rotor of the pump 14 projects forwardly of the pump housing, as shown in Fig. 2, and is provided with a pulley 25 above and in alignment with the pulley of the member 16. A belt 26 passes over the pulleys 25 and the one formed on the member 16, so that upon operation of the engine the shaft 24 will be driven to operate the pump.

Mounted upon the top of the engine, or the cylinder head casting thereof, is a supporting member 27, shown in the drawings in the form of a flat, horizontally-disposed plate. In order that this plate may be securely and rigidly attached to the cylinder head casting, a number of the ordinary cap screws used in securing said casting to the main crank case casting of the engine are removed and a plurality of sleeves or collars 28 are then placed on the cylinder head, each in alinement with one of the cap screw openings. The plate is then placed down upon the upper ends of these sleeves or collars, and cap screws 29, of greater length, are substituted for those previously removed. These cap screws serve the double purpose of fastening the cylinder head casting to the main casting of the engine and of anchoring the plate 27 securely and rigidly in position. Along one side this plate is scalloped or cut out, as at 30, to provide clearances for the spark plugs 31 of the engine; and on the other side said plate extends or projects a substantial distance beyond the corresponding side of the engine.

Supported from one corner of the overhanging portion of the plate 27, by means of bolts or the like, is a depending bracket 32, in which is journalled a section of shaft 33. This shaft section carries at its forward end a sprocket wheel 34, offset laterally with respect to both the sprocket wheels 23 and the one carried by the member 16, but lying in the same vertical plane therewith. A sprocket chain 35 passes around these three sprocket wheels 23, 34, and the one carried by the member 16, as shown more clearly in Fig. 4 of the drawings, so that upon operation of the engine the fan and the shaft section 33 will be constantly driven. The tension of the driving chain 35 may be regulated by adjustment of the oscillatory arm 20, which carries the stud upon which the hub which carries both the fan and the sprocket wheel 23 is mounted.

Supported from the other corner of the overhanging portion of the plate 27, by means of bolts or the like, is a depending gear casing 36. A second shaft section 33ª is journalled in the walls of the casing and extends forwardly thereof into driving engagement with the section 33. The connection between the sections 33 and 33ª is of the universal type, the forward end of section 33ª being squared and engaging loosely within a squared socket 37 formed in the corresponding end of the section 33. With this form of driving connection slight relative movement between the two sections is possible without in any way interfering with their operation.

Also journalled in the walls of the casing 36, and below the section 33ª, is another shaft 38, having fixed thereon a gear wheel 39. Keyed upon the shaft section 33ª, for rotation therewith, is a sleeve 40, carrying at one end thereof a gear wheel 41 and at its other end a clutch collar 42. The sleeve is keyed upon the shaft in such wise as to permit of the same being shifted bodily back and forth to bring the gear wheel 41 into or out of mesh with the gear wheel 39. This shifting of the sleeve is effected by means of a lever 43, bifurcated and pivoted, as at 44, to a bracket 44ª, and pinned intermediate its ends to one end of a reciprocable rod 45, which has its bearing in the two side walls of the casing 36, and which carries within said casing a forked member 46 which loosely engages the clutch collar 42, so that by shifting the rod 45 in one direction or the other the sleeve 40 is moved, to effect the engagement or disengagement of the gears 39 and 41, as will be readily understood. A spring-pressed keeper 47 is housed in one wall of the casing and cooperates with grooves 48 in the rod 45 to maintain the latter in either of its adjusted positions. The rear end of the shaft 38 projects through the rear wall of the casing and has fixed thereon a universal joint spider 49, of the type commonly employed in the so-called "thermoid" universal joint.

Mounted upon the frame of the vehicle, preferably at some point to the rear of the steering mechanism, is a driven element 50, which may be in the form of a gear wheel, sprocket wheel, or the like; or, in other words, any element from which power may be readily derived. This element is shown in the drawings as fixed to one end of a short section of shaft 51, journalled in a bearing bracket 52 supported from the auxiliary frame members 53. The forward end of this shaft section is also provided with a universal joint spider 54. A section of shaft 55, having a universal joint spider at each end thereof, extends between the shaft sections 51 and 38, and is attached at its opposite ends to said sections with the so-called "thermoid" universal joint disks interposed. These universal joints provide, as will be appreciated, the desired flexibility in the power shaft extending from the casing 36 to the driven element 50. While the so-called "thermoid" universal joints are shown in the drawings, this is merely for purposes of illustration, and it will be readily appreciated that universal joints of any of the other well known types may be used if desired.

The outer exposed side of the gear case 36 is provided with removable cover plates 57 and 58, so that access to the interior of the casing may be readily had for purposes of assembly or disassembly, repair, or replacement. A spout 59, preferably cast integral with the cover plate 58, is provided at the upper end of the casing 36, normally closed by a suitable cap 60, through which spout oil, grease, or other lubricant may be supplied to the gears 39 and 41, and to the other moving elements within the case.

As above pointed out, the power take-off attachments heretofore designed have been objectionable because they require considerable change and dismantling in the vehicle when the same are installed. With the present improvements objections of this nature are entirely overcome, in that said attachments may be installed without dismantling the vehicle in any way. The radiator does not even have to be removed. In fact, the only parts of the standard equipment of the vehicle which require removal and replacement are the cap screws in the cylinder head of the engine and the fan belt pulley on the forward exposed end of the crank shaft. The cap screws are replaced with slightly longer ones, as previously described, and the fan belt pulley is replaced with the combination sprocket wheel and pulley member 16, also previously described. The sprocket wheel 23 is also added, but this is done by merely mounting the same directly on the hub 18.

Aside from these few minor changes the original equipment of the vehicle is left intact, and does not require change or dismantling of any kind in the installation of the present power take-off attachment. To those skilled in the art many advantages will at once be apparent in this method of installation over those necessitated in the use of similar attachments heretofore designed.

It will be observed from the drawings that during the operation of the engine of the vehicle the two sections of the shaft 33—33ª will be constantly driven, but that shafts 38, 55, 51 will only be driven when the lever 43 is operated in such wise as to bring the gears 39, 41 into driving engagement. This lever, if desired, may of course be positioned where it can be readily operated from the driver's seat, but, as the vehicle is generally stationary when the power take-off is being used, it may be found more convenient to have the lever positioned as shown in the drawings.

Nothing is shown in the drawings beyond the driven element 50, as it will be obvious to those skilled in the art that power derived from said element or its equivalent may be utilized in driving or operating a great variety of different apparatus and machines.

It will be obvious that the present improvements are susceptible of many changes and modifications, and accordingly it is not desired to limit or restrict the same, except where limitations appear in the appended claims.

I claim:—

1. The combination with the internal combustion engine of a motor vehicle, of a supporting plate mounted on the top of said engine and projecting to one side of the latter, a bearing bracket depending from said plate, a shaft mounted in said bracket, means for driving said shaft from said engine, a casing also depending from said plate, a shaft journalled in the walls of said casing and connected to said first-named shaft at one end, a third shaft also journalled in said casing, a driven element connected to said last-named shaft at one end, a driving connection interposed between said second and third shafts, and means for rendering said connection operative or inoperative.

2. The combination with the internal combustion engine of a motor vehicle, of a supporting plate mounted on the top of said engine and projecting to one side of the latter, a bearing bracket depending from said plate, a shaft mounted in said bracket, means for driving said shaft from said engine, a casing also depending from said plate, a shaft journalled in the walls of said casing and connected to said first-named shaft at one end, a third shaft also journalled in said casing, a driven element connected to said last-named shaft at the end, a driving connection interposed between said second and third shafts, and means for rendering said connection operative or inoperative, said driving connection comprising a plurality of gears, one of which is movable into and out of operative position.

3. The combination with the internal combustion engine of a motor vehicle, of a supporting plate mounted on the top of said engine and projecting to one side of the latter, a bearing bracket depending from said plate, a shaft mounted in said bracket, means for driving said shaft from said engine, a casing also depending from said plate, a shaft journalled in the walls of said casing and connected to said first-named shaft at one end, a third shaft also journalled in said casing, a driven element connected to said last-named shaft at one end, a driving connection interposed between said second and third shafts, and means for rendering said connection operative or inoperative, the connection between said first and second shafts being of the universal type to permit of relative movements therebetween.

4. The combination with the internal combustion engine of a motor vehicle, of a power take-off attachment secured thereto, said attachment comprising a supporting plate mounted on said engine, a shaft carried by said plate, means for driving said shaft from said engine, a second shaft carried by said plate and connected with said first shaft, a third shaft also carried by said plate, a driven element connected to said last named shaft, and manually controlled transmission mechanism interposed between said second and third shafts, said attachment being bodily attachable to and detachable from said engine as a unit.

In testimony whereof, I have subscribed my name.

ALBERT T. SCANNELL.